Feb. 12, 1952 J. B. MERCHANT 2,585,152
GATE
Filed Feb. 13, 1947

Inventor
J. B. Merchant
By Arthur H. Sturges
Attorney

Patented Feb. 12, 1952

2,585,152

UNITED STATES PATENT OFFICE 2,585,152

GATE

Jacob B. Merchant, Red Oak, Iowa

Application February 13, 1947, Serial No. 728,357

5 Claims. (Cl. 39—82)

This invention relates to farm fence gates and more particularly it is an object of the invention to provide a fence gate which may be raised with respect to the surface of the ground.

Snow drifting around fence gates on farms and the like frequently makes it necessary for a user to first shovel the snow from around the gate in order to open it. Such gates are often relatively wide and for that reason it frequently happens that hummocks in the surface of the ground in the path of the opening-swing of such a gate make it necessary to remove the hummock before the gate is in working order. It is an object of the invention to provide a fence gate for the purpose described so constructed as to be easily raised from the surface of the ground for passing over such hummocks and snow drifts without their removal.

Another object of the invention is to provide a fence gate, as described, the latch end of which may be raised with respect to the surface of the ground and with respect to the hinged end thereof.

Still another object of the invention resides in the provision of a fence gate as described so constructed that the entire gate may be raised from the surface of the ground while maintaining its lower surface in general parallellism with the surface of the ground for raising the position of the gate either for temporary periods or for permanent usage.

Other and still further objects and advantages of the invention will become apparent from the following detailed description thereof.

Figure 1:
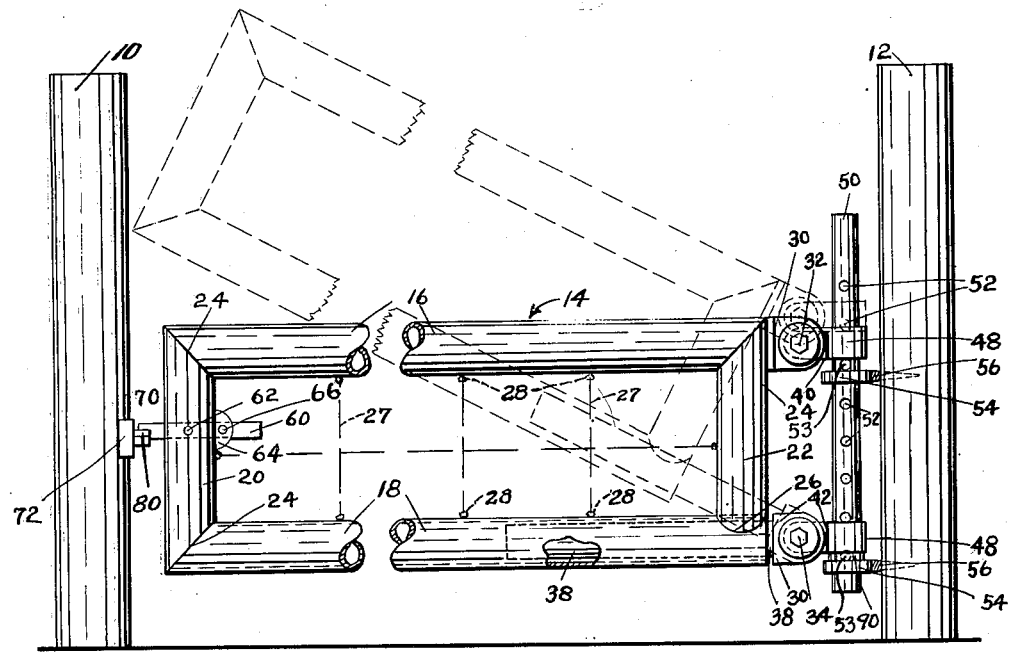
Figure 1 is a frontal elevation of the fence gate of this invention, parts thereof being broken away, and a raised position of the gate being shown in dotted lines.
Figure 2:
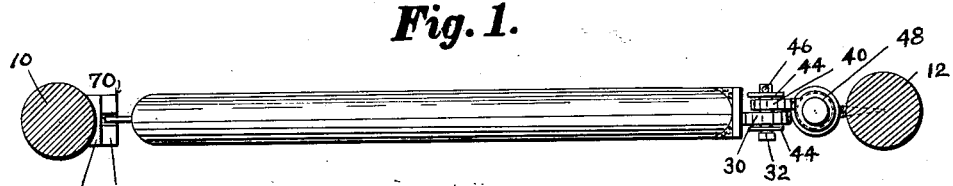
Figure 2 is a top plan view of the gate shown in Figure 1.

The fence gate of this invention is for attachment between a pair of fence posts or supports 10 and 12, the posts being spaced apart any desired distances and normally comprising posts of a fence, not shown.

The fence gate of this invention includes a door-section generally indicated at 14. The door-section 14 is preferably of a rectangular shape having parallel spaced top and bottom members 16 and 18, respectively. A pair of end members 20 and 22 are welded or otherwise suitably secured at either end of the top and bottom members or rails 16 and 18. The joints 24 between the side members 20 and 22 and the top and bottom members 16 and 18 may all be mitered at a right angle to the respective members although that joint 26 which is at one of the lower corners of the door-section 14 may be a butt-joint for purposes later described.

The door-section or gate 14 is preferably provided with barbed wire 27 suitably stretched between eyelets 28, for preventing the escape of animals therethrough. The eyelets 28 may be welded or otherwise secured to the top and bottom members 16 and 18.

The members 16, 18, 20 and 22 are preferably formed of hollow pipe. Positioned at the top and bottom and protruding outwardly from the two corners at one side of the door-section 14 are a pair of ears or hinge plates 30. The latter protrude outwardly generally parallel to the members 16 and 18 and are provided with apertures or openings for the receipt of a pair of bolts 32 and 34.

The upper ear 30 is rigidly secured to the door-section 14 by welding or the like. The lower ear 30 is secured to a rod or pipe 38, the latter being of a lesser diameter than the pipe 18. The pipe 38 extends into the pipe 18 a considerable distance, as best shown in Figure 1 and a sufficient distance so that if the lower bolt 34 were maintained in its original position and the gate 14 were pivoted about the bolt 32 then the pipe 38 would at all times be still partly positioned within the pipe 18.

The bolts 32 and 34 attach the ears 30 to a pair of apertured tabs 40 and 42, the latter being positioned parallel to and adjacent the ears 30. A pair of washers are provided at either end of each of the bolts 32 and 34 and the bolts 32 and 34 are each held in place and in their position in the tabs and ears by means of a cotter pin 46 at the opposite end of each of the bolts 32 and 34 from their heads. The tabs 40 and 42 are each provided at their other end with an annular end portion or hub 48.

The upright standard or vertically disposed rod 50 spaced from and in parallelism with the post 12 is in a position disposed through each of the spaced annular portions 48, the standard 50 being rounded and of an outer diameter complemental to the inside walls of the annular portions 48. The standard 50 is provided with a series of spaced apertures 52 therein extending substantially the length of the standard 50.

A pair of securing rings 54 are disposed about the standard or rod 50, one below each of the annular portions 48. The rings 54 are each provided with a spike portion 56, the latter extending outwardly from the sides of the rings 54 and normally positioned in the post 12. The spike portions 56 are preferably tapered so that they may be hammered into the post 12.

The standard 50 extends below the lower ring 54 a short distance and a distance considerably above the upper annular portion 48, that portion of the standard 50 which is above the upper annular portion 58 being also provided with spaced apart apertures 52.

That end of the gate 14 which is disposed in the direction of the post 10 is provided with a latch bar 60 extending through suitable slots in the member 20, the latch bar 60 being adapted to slide through the member 20 backward and forward in directions parallel with the gate 14. The latch bar 60 is preferably provided with a series of spaced apart holes therethrough so that pins may be inserted through an aperture 62 in the side of the member 20. If desired, a nib 64 may be attached on the inner side of the member 20 and adjacent the latch bar 60, the nib 64 being provided with an aperture 66 so that a pin may be inserted through the aperture 66 and a desired one of the spaced apertures, not shown, in the latch bar 60.

Figures 3, 4:
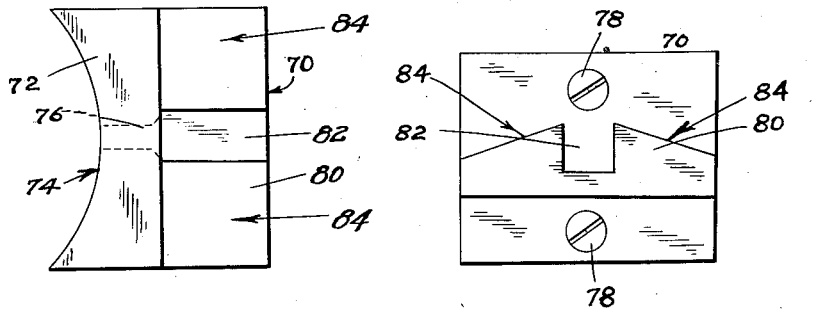
Figure 3 is an enlarged top plan detailed view of the notched member shown in Figure 1 into the notch of which the gate latch is adapted to engage.
Figure 4 is a frontal elevation of the notched latch member shown in Figure 3.

The fence post 10 is provided with a notched member generally indicated at 70, the latter including a post abutting portion 72. The post abutting portion 72 is preferably rounded on one side thereof, as indicated at 74, for the purpose of snugly engaging about a rounded post 10. The portion 72 is also provided with a pair of apertures 76 extending therethrough for receiving suitably screws 78, as best shown in Figure 4, the latter extending into the post 10. The notched member 70 is also provided with an outwardly protruding lug 80 extending outwardly and at a right angle from the post abutting portion 72, the lug 80 extending in the direction of the latch bar 60. The lug 80 is provided with a notch 82 in the upper side thereof of a size for receiving the latch 60 at desired times and the top corners of the lug 80 at either side of the notch 82 are preferably tapered downwardly, as shown at 84, so that at times when the gate is closed from either direction the latch 60 will be guided upwardly and into the notch 82.

As thus described, it will be seen that a gate constructed in accordance with the invention may be raised and lowered by raising the free end of the gate 14 upwardly, pivoting the same about the upper bolt 32 in order to clear a snowdrift, hill or the like. At such times the pipe 38 will slide freely in the pipe 18, and the upper ring or annular portion 48 will slide upwardly a slight distance shown in dotted lines in Figure 1.

If desired, a gate as described may be either permanently or temporarily set in a higher or lower position with respect to the fence posts 10 and 12 by raising the gate 14 and then inserting a suitable pin 53 in one of the apertures 52 beneath one of the annular portions 48 and for this purpose a washer such as is indicated at 90 may be used and positioned between such a pin and the adjacent annular portion 48.

From the foregoing description, it is thought to be obvious that a gate constructed in accordance with my invention is particularly well adapted for use by reason of the convenience and facility with which it may be assembled and operated, and it will also be obvious that my invention is susceptible of some change and modification without departing from the principles and spirit thereof and for this reason, I do not wish to be understood as limiting myself to the precise arrangement and formation of the several parts herein shown in carrying out my invention in practice, except as claimed.

I claim:

1. A gate for closing a gateway opening bounded by a pair of vertically disposed spaced apart supports comprising a door section disposed between said supports in a vertical plane and including a pipe forming the lower rail of said door section, said lower rail having an opening in the end thereof being disposed toward one of said supports; a rod partially telescopically disposed in said pipe; means pivotally attaching the outer end of said rod to said one support in a manner permitting pivotal movements of said rod in both horizontal and vertical planes; means pivotally attaching said door member to said one of said supports in a manner whereby said door section is free to swing without distortion in both vertical and horizontal planes and permitting movement of said rod as a whole in vertical directions, said pivotal attaching means being disposed above said pipe; and means removably connecting the other one of said supports to the side of said door member adjacent that other support.

2. A gate for closing a gateway opening bounded by a pair of vertically disposed spaced apart supports comprising a door section disposed between said supports in a vertical plane and including a pipe forming the lower rail of said door section, said lower rail having an opening in the end thereof being disposed toward one of said supports; a vertically disposed standard disposed between said door section and said one support, said standard being secured to said one support in a manner preventing movement of said standard vertically with respect to said one support, said standard being provided with a series of spaced apart apertures therethrough; a ring rotatably and slidably disposed about said standard; means pivotally attaching said ring to said door section in a manner permitting said door section to pivot in a vertical plane with respect to said ring; a pin removably disposed in any selected one of said holes for maintaining said ring and door section at a desired vertical position with respect to said standard; a rod partially telescopically disposed in said pipe; a second ring disposed rotatably and slidably about said standard, said second ring being disposed beneath said first mentioned ring; means securing said second ring to the exposed end of said rod in a manner permitting the pivotal movement of that end of said rod which is disposed in said pipe in a vertical direction with respect to said second ring; and means removably connecting the other one of said supports to the side of said door member adjacent that other support.

3. A gate for closing a gateway opening having a vertically disposed post at each side thereof comprising a standard carried by one of said posts in approximate parallelism therewith; two spaced apart members pivotally attached to said standard for horizontal swinging pivotal movements, one of said members being slidable along said standard; a door section disposed between said posts in a vertical plane, the upper portion of one end of said door section being pivotally secured to the upper one of said members for permitting said door to pivot in a vertical plane; means for permitting the other end of said gate to swing upwardly, said upward swing permitting mechanism comprising an elongated member having one end thereof slidably attached to a lower portion of said gate, the other end of said elongated member being pivotally secured to the lower one of said spaced apart members for swinging movements in a vertical plane.

4. In a gate assembly, the combination which comprises a pair of posts, a pair of rings positioned in spaced horizontal planes extended from one of said posts, a vertically disposed rod having spaced openings extended therethrough positioned in the said rings, spaced upper and lower hubs slidably mounted on the said rod, said hubs having tabs with openings therein extended therefrom and said tabs positioned in a common vertical plane, a gate having horizontally disposed tubular rails connected at the ends with vertical members positioned between the said posts, an upper hinge plate having an opening therethrough extended from an upper corner of the gate, a lower hinge plate extended from the lower corner of the end of the gate from which the upper hinge plate extends, bolts extended through the said hinge plates and tabs for connecting the gate to the said vertically disposed rod, pins extended through the said openings of the vertically disposed rod for retaining the said rod and gate in adjusted positions, means adjusting the distance of the said lower hinge plate from the lower corner of the gate, and a latch for temporarily holding the end of the gate opposite to that on which the said hinge plates are positioned to the other of the said posts.

5. In a gate assembly, the combination which comprises a pair of posts, a pair of rings positioned in spaced horizontal planes extended from one of said posts, a vertically disposed rod having spaced openings extended therethrough positioned in the said rings, spaced upper and lower hubs slidably mounted on the said rod, said hubs having tabs with openings therein extended therefrom and said tabs positioned in a common vertical plane, a gate having horizontally disposed tubular rails connected at the ends with vertical members positioned between the said posts, an upper hinge plate having an opening therethrough extended from an upper corner of the gate, a rod slidably mounted in the lower rail of the gate and positioned to extend from the end of the gate upon which the upper hinge plate is positioned, a lower hinge plate carried by the extended end of the rod in the lower rail of the gate, bolts extended through the said hinge plates and tabs for mounting the gate on the said vertically disposed rod, pins extended through the openings in the vertically disposed rod for retaining the rod and gate in adjusted positions, and a latch for temporarily holding the end of the gate opposite to that on which the hinge plates are positioned to the other of the said posts.

JACOB B. MERCHANT.

REFERENCES CITED

The following references are of record in the file of this patent:

UNITED STATES PATENTS

| Number | Name | Date |
|---|---|---|
| 239,559 | Schamberger | Mar. 29, 1881 |
| 381,859 | Stanley | Apr. 24, 1888 |
| 676,429 | Ellis | June 18, 1901 |
| 727,734 | Barley | May 12, 1903 |
| 832,428 | Spilger | Oct. 2, 1906 |
| 865,577 | Edwards | Sept. 10, 1907 |
| 1,079,283 | Akre | Nov. 18, 1913 |
| 1,316,062 | Rowe | Sept. 16, 1919 |
| 2,172,868 | Elson | Sept. 12, 1939 |